May 6, 1930.  K. H. KAZAZIAN  1,757,909
UTENSIL CLEANING MACHINE
Filed Feb. 15, 1929  2 Sheets-Sheet 1

K. H. Kazazian, INVENTOR
BY Victor J. Evans
ATTORNEY

May 6, 1930.  K. H. KAZAZIAN  1,757,909
UTENSIL CLEANING MACHINE
Filed Feb. 15, 1929   2 Sheets-Sheet 2
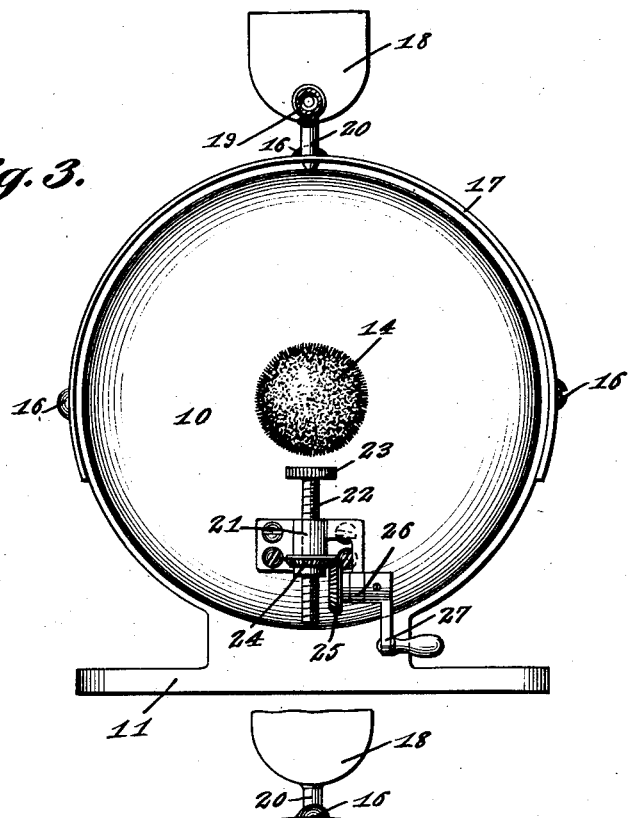
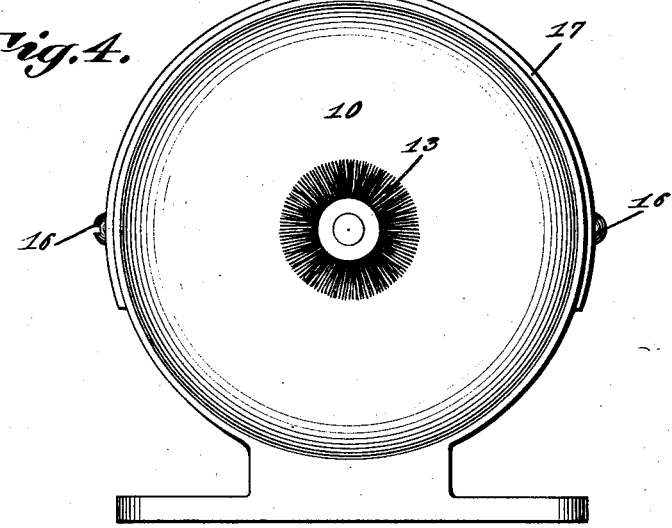
K. H. Kazazian, INVENTOR
BY Victor J. Evans
ATTORNEY Patented May 6, 1930

1,757,909

UNITED STATES PATENT OFFICE

KRIKOR H. KAZAZIAN, OF CHICAGO, ILLINOIS

UTENSIL-CLEANING MACHINE

Application filed February 15, 1929. Serial No. 340,164.

This invention relates to cleaning machines especially adapted for cleaning cooking utensils, although it is useful for washing dishes and for other purposes.

An object of the invention is the provision of a cleaning machine by means of which dry soot and burnt grease may be effectually removed from the outside of a utensil, and the utensil afterward thoroughly cleaned and polished, means being also provided for washing both the inside and outside of a vessel or dish and for supporting said vessel or dish during the washing operation.

Another object of the invention is the provision of a cleaning device or machine which is of unitary structure, the machine including a motor whose housing serves as a support for the remaining elements of the machine.

With the above and other objects in view, the invention further includes the following novel features and details of construction, to be hereinafter more fully described, illustrated in the accompanying drawings and pointed out in the appended claims.

In the drawings:—

Fig. 3 is an end view.

Figure 4 is an end view looking at the end remote from that shown in Figure 3.

Figure 1:
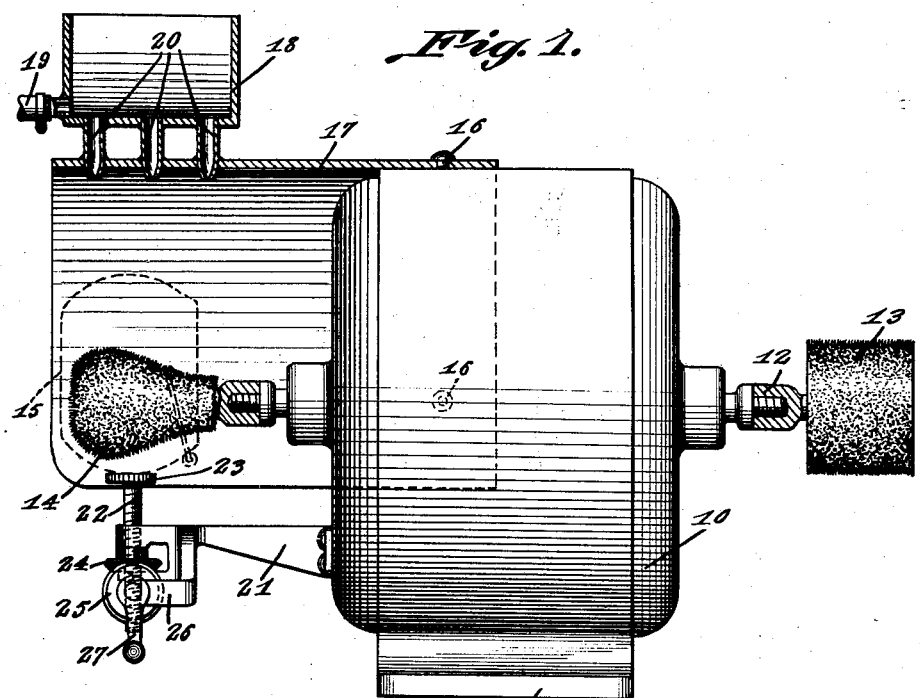
Figure 1 is an elevation partly in section illustrating a washing or cleaning machine constructed in accordance with the invention.
Figure 2:
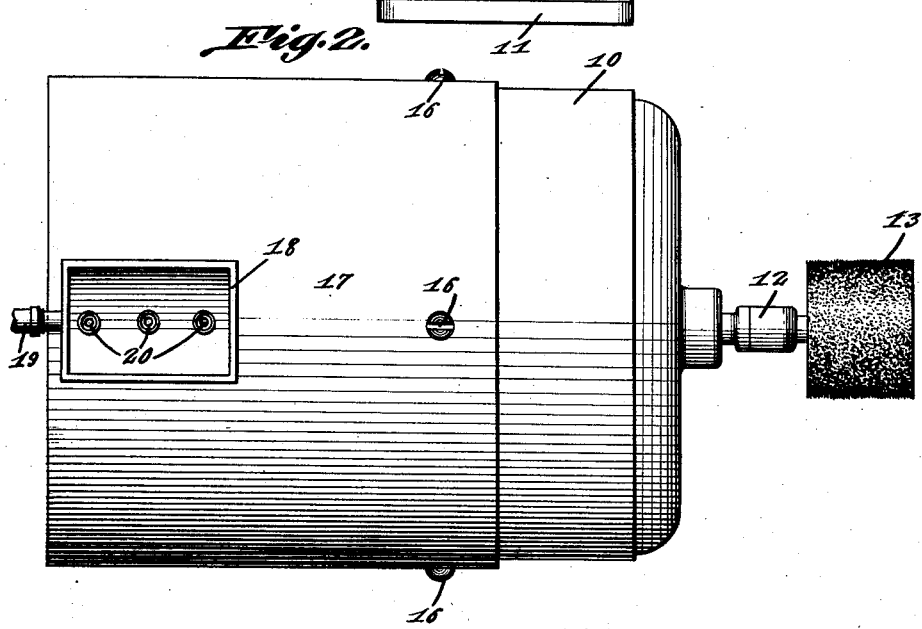
Figure 2 is a plan view.

Referring to the drawings in detail wherein like characters of reference denote corresponding parts, the reference character 10 indicates a motor which may be mounted upon a suitable base 11 so as to provide a suitable support. Mounted upon the shaft of the motor as indicated at 12 is a brush 13 having stiff bristles which are adapted for the purpose of removing burnt grease and soot from cooking utensils.

The opposite end of the motor shaft has mounted thereon a brush 14 whose bristles are relatively soft. This brush is adapted for use in cleaning dishes, or the inside walls of pots as indicated by the dotted lines at 15 in Figure 1 of the drawings, or for cleaning dishes and the like.

Secured to the motor housing as shown at 16 is a guard 17. This guard extends outwardly from the housing around the brush 14 and acts to support a container 18 which may be connected to a suitable source of water supply by means of a hose 19. This container is adapted to contain soap or other cleansing agent and has extending downwardly therefrom tubes 20 which serve to secure the container 18 to the guard 17 and to permit of the passage of water or other cleansing fluid from the container to the brush.

Secured to the housing of the motor 10 is a bracket 21 within which is threadedly mounted a shaft 22 and this shaft carries at its upper end a support 23 upon which the article being cleaned is rested. Swiveled in the bracket 21 is a beveled pinion 24 which is engaged and driven by a similar pinion 25. This last mentioned pinion is carried by a stub shaft mounted in a bearing 26 which forms a part of the bracket, while secured upon this stub shaft is a crank handle 27. By means of the handle 27, the support 23 may be adjusted with respect to the brush 14 and in accordance with the article being cleaned.

Suitable means may be provided for regulating the flow of water or other liquid through the pipe 19 into the container 18, while the guard 17 which supports the container also serves to prevent the soapy water or other fluid from being thrown outward beyond the motor housing.

The invention is susceptible of various changes in its form, proportions and minor details of construction and the right is herein reserved to make such changes as properly fall within the scope of the appended claims.

Having described the invention what is claimed is:

1. In a cleaning machine, a motor having a housing, a brush driven by the motor, means carried by the housing of the motor to support an article to be cleaned, means to adjust the article suporting means with respect to the brush, a guard secured to and extending from the housing around the brush, and means carried by the guard to supply a cleansing agent to the brush.

2. In a cleaning machine, a motor having a housing, a brush driven by the motor, means carried by the housing of the motor to support an article to be cleaned, a guard secured to and extending from the housing around the brush, a container positioned above the guard, means to connect the container with a source of water supply, and combined supporting and conductor tubes connecting the container and guard and supporting the container.

3. In a cleaning machine, a motor having a housing, a brush driven by the motor, a bracket supported by the housing of the motor, an article support positioned beneath the brush and mounted for adjustment in the bracket to support an article to be cleaned, a guard secured to and extending from the housing around the brush, and means carried by the guard to supply a cleansing agent to the brush.

In testimony whereof I affix my signature.

KRIKOR H. KAZAZIAN.